April 12, 1932.   J. M. G. FULLMAN   1,853,558
UNIVERSAL LEVEL
Filed April 6, 1929
FIG. I.
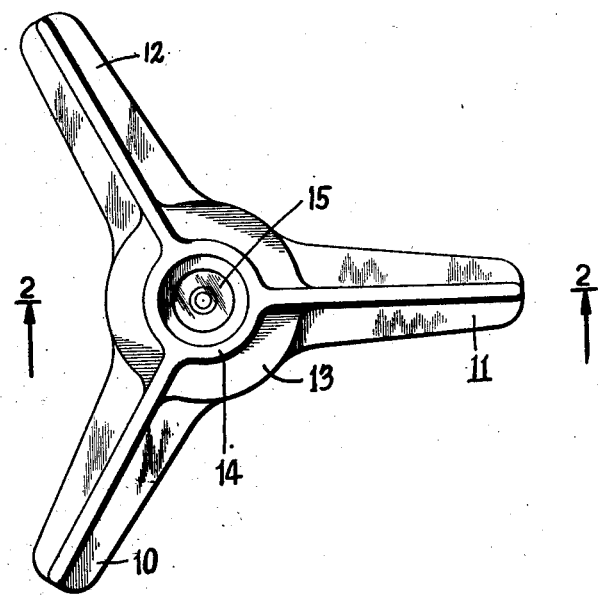
FIG. 2.
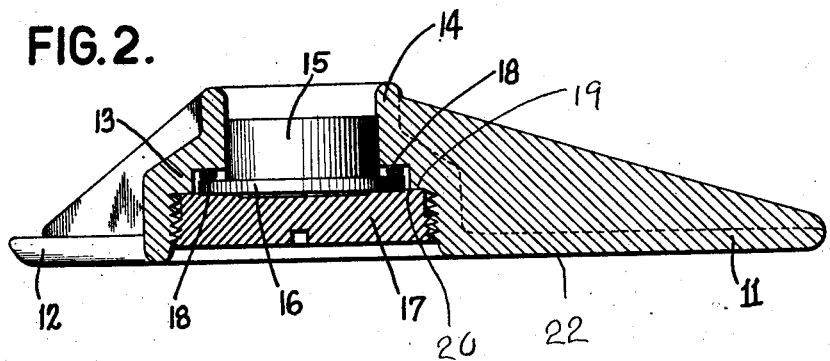
James M. G. Fullman
Inventor
By his Attorneys
Cooper, Kerr & Dunham Patented Apr. 12, 1932

1,853,558

UNITED STATES PATENT OFFICE

JAMES M. G. FULLMAN, OF SEWICKLEY, PENNSYLVANIA, ASSIGNOR TO NATIONAL ELECTRIC PRODUCTS CORPORATION, OF NEW YORK, N. Y., A CORPORATION OF DELAWARE

UNIVERSAL LEVEL

Application filed April 6, 1929. Serial No. 353,006.

This invention relates to universal levels.

Liquid levelling devices generally comprise two main types. One type comprises the straight tube level which indicates level or out of level conditions along the line of the straight tube.

Another type of liquid level previously employed is the so-called universal bubble level which is so constructed that the bubble aligns substantially with the centre of the level unit in the event that there is a level condition and which displaces in various directions from the centre to indicate an out of level condition of displacement of the bubble with these bubble levels shows the direction in which the parts are out of level.

The present invention is directed to improvements in the second mentioned class of levels above set forth and is directed to the provision of a level of this class which is cheaply produced and assembled and which provides for the necessary accuracy required in a device of this character.

A further object of the present invention resides in the provision of a level device of such character that it is readily adapted for determining level and out of level conditions and the direction of out of level conditions of structures and other parts which are of such character and size that they do not readily permit the use of universal bubble level units which are now available.

Accordingly, one object of the present invention resides in the provision of a supporting structure for a bubble level unit which will enable such bubble level unit to be used in levelling operations upon cooperating parts which heretofore did not permit the use of such bubble level unit.

A further object of the present invention resides in the provision of a level of rugged character which may be readily carried about by workmen without the possibility of damage to the bubble level unit itself. Such unit is of fragile character and the supporting and encasing structure is intended to afford protection to the unit against damage.

Further and other objects of the present invention will be hereinafter set forth in the accompanying specification and claims and shown in the drawings, which by way of illustration show what I now consider to be a preferred embodiment of the invention.

In the drawings:

Fig. 1 is a top plan view of the complete level assembly; and

Fig. 2 is a sectional view taken on line 2—2 of Fig. 1.

In more detail the main body part of the level preferably comprises a casting having three projecting arm portions 10, 11 and 12 disposed and radiating from a hub portion 14 and preferably with each arm spaced 120 degrees from the adjacent arms. The hub portion 13 is interiorly hollowed out to receive a bubble level unit 15 which is of a conventional type. Such bubble level unit is of the usual liquid level type in which there is a bubble visible through the glass cover of the unit (see Fig. 1) and which bubble, according to the direction which it is displaced from the centre of the glass, is adapted to universally indicate the direction of out of level conditions. If the bubble in contradistinction, is in the centre of the glass a level condition is indicated. The bubble unit is relatively light and fragile and it is accordingly protected by mounting it in a hollowed out part of the hub 13 in the main body portion. The unit 15 is provided with an annular base portion 16 and such unit is placed into the hub and forced up against a gasket 18 which abuts an annular shoulder in the hub by tightening up a slotted screw plug 17 which fits threads in the hub.

In the making of the parts of shoulder 19 is machined in the hub of the body portion and the bottom surface 22 is also machined. Preferably the machining operation is effected with the same setting so that exact parallelism is maintained between the shoulder 19 and the bottom surface 22 of the assembly. By proceeding in this manner, cheap and accurate alignment of the various parts may be secured when they are assembled together. The plug 17 has a flat shoulder 20 coming into contact with the shoulder 19 of the frame and which shoulder 20 also forms a seat for the level unit 15. When the parts are assembled together, the shoulders or surfaces 19 and 20 are brought into abutting contact and level unit 15 is also brought into contact with the shoulder 20 so that the level unit 15 is then in true and accurate alignment with the bottom surface 22 of the frame or body portion.

The gasket 18 holds the flange 16 of the level unit firmly in contact with the surface 20 of the plug 17 and if desired, cement may be applied to effectively seal the unit 15 within the hollow hub. Cementing may be effected at the time of assembly and when cement is used the gasket 18 holds the level unit 15 with its flange 16 into proper relationship with the body parts of the device during the setting of the cement.

The gasket if used alone, and the gasket and the cement, if the latter is used, afford a seal which prevents any ingress of moisture into the interior and the use of the gasket also provides a simple means for clamping the unit in position during the assembly of the device. Preferably when the unit 15 is in position, its top terminates somewhat below the top of the opening in the hub so that the hub itself serves as a protection for the glass in the level element or unit.

When in use the equally spaced arms 10, 11 and 12 serve to form a three-point support for the complete level assembly. The level assembly can be placed on any parts which it is desired to level up and the direction in which the parts are out of level can be readily ascertained. The three-prong base construction finds particular utility in levelling up electrical conduit installations having outlet boxes of various shapes and configurations. Such arms are adapted to bridge the open tops of boxes or open parts and to provide a three-point support for the level unit proper so that it is merely necessary to place the assembly upon the parts to be levelled and observe the bubble which will immediately show if there is the proper level condition or if the parts are out of level it will show in which direction the parts are out of level. By the use of the multi-armed base or body portion it is obvious that parts can be levelled which heretofore were not adapted to be levelled by simple universal level bubble units alone.

What I claim is:

1. A level device which comprises a body portion provided with a hub and with arm portions, a level unit carried by the hub portion and having a base portion, a plug fitting on a shoulder within the hub which is parallel with the base of the body portion, said plug also having a seating surface which commonly abuts the shoulder in the hub of the body portion and also abuts the base of the level unit so that the level unit is automatically aligned true with the body portion.

2. A level assembly which comprises a body portion having hub and arm portions, a level unit carried by and within the hub and having a base portion, said hub having a shoulder seating surface therein which is parallel to the base of the level assembly, a plug fitted within the hub and having a seating surface which is common to the shoulder in the hub and to the base of the level unit, and a gasket holding the level unit into engagement with the aforesaid plug.

3. A level comprising a body having a central hub provided with a plane base surface portion and three arms radiating therefrom and affording spaced relatively extensive supporting surfaces lying in a plane with said base surface, and a level unit carried by the hub.

4. A level comprising a body having a hub provided with a plane base surface and a central bore, said body having enlarged recesses forming a continuation of said bore and producing two spaced shoulders, integral arm portions radiating from the hub and having relatively extensive supporting surfaces lying in a plane with the base surface of the hub, a level unit fitted within the bore and having a base portion lying in one of the recesses, a plug fitted within the other of said recesses and having a seating surface which is common to one of the shoulders and to the base level unit, and means interposed between the other shoulder and the base of the level unit for holding said level unit in contact with the plug.

5. A level comprising a body having a hub provided with a plane base surface and with a central bore, a shoulder in said bore, a level unit fitted within the hub bore, a plug fitted within the said bore and having a seating surface which is parallel to the base of the hub for supporting said level unit, and means interposed between said shoulder and a portion of the level unit for holding the level unit in engagement with the plug.

In testimony whereof I hereto affix my signature.

JAMES M. G. FULLMAN.